J. P. WOODWARD.
VEGETABLE BUCKET.
APPLICATION FILED JUNE 24, 1918.

1,307,608.

Patented June 24, 1919.

INVENTOR
J. P. Woodward
BY
ATTORNEY

UNITED STATES PATENT OFFICE.

JOHN P. WOODWARD, OF SEATTLE, WASHINGTON.

VEGETABLE-BUCKET.

1,307,608.

Specification of Letters Patent. Patented June 24, 1919.

Application filed June 24, 1918. Serial No. 241,501.

*To all whom it may concern:*

Be it known that I, JOHN P. WOODWARD, citizen of the United States, residing at Seattle, in the county of King and State of Washington, have invented certain new and useful Improvements in Vegetable-Buckets, of which the following is a specification.

This invention relates to improvements in vegetable buckets and has for its principal object to provide a bucket which is handy and convenient and into which vegetables such as potatoes, beets, carrots and the like may be thrown as they are dug from the ground without the soil accumulating within the bucket. This and other objects I attain by the peculiar arrangement and combination of the parts as will be hereinafter more fully explained in the following specification, shown in the accompanying drawings and finally pointed out in the appended claim.

Figure 1:
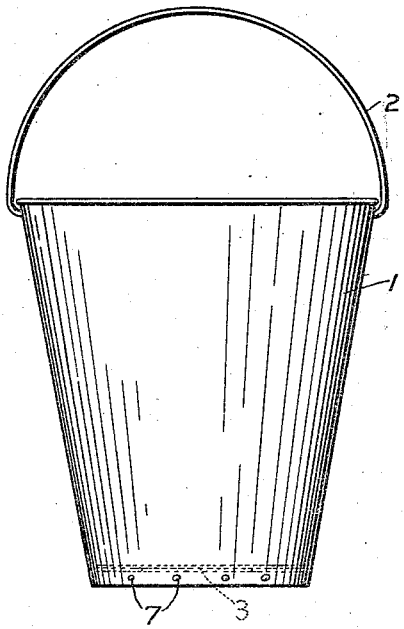
Figure 2:
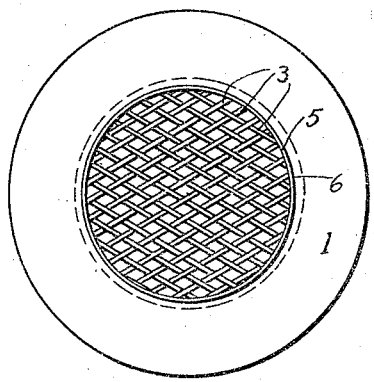
Figure 4:
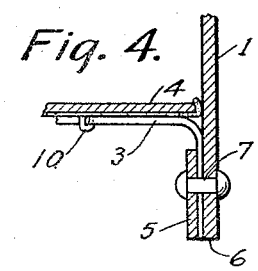
Figure 3:
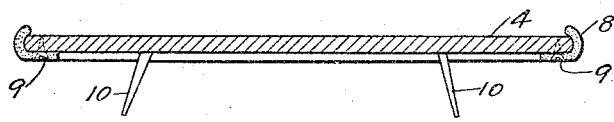

In the drawings Figure 1 is a side elevation of my improved bucket. Fig. 2 is a plan view with the bail of the bucket omitted. Fig. 3 is a sectional view of the removable bottom. Fig. 4 is an enlarged detailed sectional view showing the manner in which the permanent bottom is fastened to the walls of the bucket and also showing a fragment of the removable bottom.

Referring now more particularly to the drawings numeral 1 indicates the bucket, 2 the handle or bail, 3 represents a wire mesh bottom for the bucket, 4 a removable bottom which is adapted to rest upon the fixed wire mesh bottom, 5 is an inner circular band which fits snugly within the bottom edge 6 of the bucket proper. The wires which form the fixed mesh bottom 3 are each bent downwardly at substantially right angles, as will be plain by an examination of the Fig. 4, and these downwardly bent portions of the wires 3 are caught between the band 5 and the lower edge of the bucket. When the parts are in the positions as shown in Fig. 4 the downwardly bent ends of the wire bottom 3 are clamped securely between the band 5 and the walls of the bucket by means of rivets 7. From the foregoing it will be seen that a strong, substantial and serviceable bucket is formed with an open mesh bottom so that when the vegetables are thrown into it the soil clinging to them will be dislodged when the vegetables strike the wire mesh and that this loose soil will sift through the mesh leaving the vegetables substantially free and clean. It will be noted that the mesh bottom of the bucket is spaced away from the lower edge a considerable distance so that if the bucket remains in a certain place for sometime while the vegetables are being thrown into it the wire mesh bottom will allow the soil to sift through without its banking or caking in the mesh, as will be understood.

The removable bottom 4 is formed of a body plate, around the periphery whereof is a rubber or leather washer 8 which is fastened to the main bottom by means of screws 9. Extending downwardly from the body portion are spikes 10 which are adapted to project through the mesh in the fixed bottom, as will be understood. By use of this removable bottom it will be seen that the bucket may be readily converted into a vessel which may be used as a feed bucket or for other like purposes. The bucket would safely carry even very small grain such as oats, bran, etc., when the removable bottom is in place, the rubber washer 8 making a tight fit and preventing leakage. This rubber washer has a still further function in that it prevents the falling out of a false bottom when the bucket be upturned in emptying its contents. This retaining action of the washer 8 is helped by reason of the spikes 10 which slant outwardly slightly and are of spring material.

While I have shown a particular form of embodiment of my invention, I am aware that many minor changes therein will readily suggest themselves to others skilled in the art without departing from the spirit and scope of the invention and I therefore desire to avoid being limited to the exact form shown and described, except as pointed out in the appended claim.

Having described my invention, what I claim as new and desire to protect by Letters Patent, is:—

In a device of the class described the combination of an open mesh bottom and means for permanently fastening the same to the walls of the bucket, the said mesh bottom being in spaced relation to the bottom edge of the bucket, and a solid removable bottom adapted to rest upon the mesh bottom, and means for holding the said solid bottom in position including a resilient washer around the periphery of the solid bottom and outwardly sprung spikes projecting from the solid bottom and adapted to pass through the said mesh bottom.

In testimony whereof I affix my signature in the presence of two witnesses.

JOHN P. WOODWARD.

Witnesses:
MARGUERITE LYON,
GENEVA ELDER.